(12) United States Patent
Angelov et al.

(10) Patent No.: US 9,810,850 B1
(45) Date of Patent: Nov. 7, 2017

(54) FIBER GRIPPER ASSEMBLY FOR OPTICAL CONNECTORS

(71) Applicant: TYCO ELECTRONICS CORPORATION, Berwyn, PA (US)

(72) Inventors: Aleksandar Kolev Angelov, Harrisburg, PA (US); Daniel Wesley Flemmens, York, PA (US); Michael Fredrick Laub, Enola, PA (US); Jason Thomas Chiota, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/236,751

(22) Filed: Aug. 15, 2016

(51) Int. Cl.
*G02B 6/34* (2006.01)
*G02B 6/36* (2006.01)
*G02B 6/38* (2006.01)

(52) U.S. Cl.
CPC ........... *G02B 6/364* (2013.01); *G02B 6/3636* (2013.01); *G02B 6/3865* (2013.01); *G02B 6/3885* (2013.01); *G02B 6/3887* (2013.01)

(58) Field of Classification Search
CPC .............................. G02B 6/3636; G02B 6/364
See application file for complete search history.

(56) References Cited

U.S. PATENT DOCUMENTS

| | | | | |
|---|---|---|---|---|
| 6,483,980 B1* | 11/2002 | Wu | ...................... | G02B 6/2938 385/137 |
| 6,810,195 B2* | 10/2004 | Bhagavatula | ........ | G02B 6/3636 385/137 |
| 7,275,953 B2* | 10/2007 | Brown | ............... | H01R 43/0263 439/449 |
| 2001/0036341 A1* | 11/2001 | Ohtsuka | ................... | G02B 6/25 385/78 |
| 2002/0191939 A1* | 12/2002 | Daoud | ................. | G02B 6/4471 385/135 |
| 2005/0129380 A1* | 6/2005 | Takeuchi | ............... | C03B 23/037 385/137 |
| 2006/0188211 A1* | 8/2006 | Iwase | ................... | G02B 6/1228 385/137 |
| 2012/0257860 A1* | 10/2012 | Li | ........................ | G02B 6/3858 385/83 |
| 2014/0321809 A1 | 10/2014 | Bowen et al. | | |

\* cited by examiner

*Primary Examiner* — Jerry Rahll

(57) ABSTRACT

A fiber gripper component includes a fiber receiving recess which extends from a first surface of the fiber gripper component toward a second surface of the fiber gripper component. The fiber receiving recess extends from a front face to a rear face. The fiber receiving recess has a fiber receiving surface which is positioned between the first surface and the second surface. A plurality of resilient fiber receiving grooves extend from the fiber receiving surface toward the second surface. The resilient fiber receiving grooves have a width which is less than an outer-diameter dimension of mating optical fibers to provide a press fit of the optical fibers into the resilient fiber receiving grooves. The fiber gripper component is molded with tolerances in the submicron range to maintain part functionality to allow automatable fiber assembly.

19 Claims, 6 Drawing Sheets

FIBER GRIPPER ASSEMBLY FOR OPTICAL CONNECTORS

FIELD OF THE INVENTION

The present invention relates to a fiber gripper assembly for optical connectors. In particular, the invention is directed to a precision molded fiber gripper assembly that allows offline automatable fiber assembly into the gripper component and subsequent automation assembly into a molded fiber optical housing.

BACKGROUND OF THE INVENTION

The current state of optical connectors for both the passive and active markets are expensive to manufacture due to the design of molded components not allowing for automation and relying solely on manual labor intensive processes to assemble. These components require an operator to manually assemble multi-fiber configurations into tightly controlled precision fiber bore diameters in the realm of a few hundred microns and below. This current fiber termination process is extremely difficult to design for automation which results in high manufacturing costs of the connector assembly.

It would, therefore, be beneficial to provide an automatable precision compatible fiber gripper that can be utilized as a precision molded assembly for these precision optical connector components, thereby significantly reducing the applied costs in the manufacturing process. It would also be beneficial to provide such a fiber gripper without sacrificing tight tolerances which enable part functionality.

SUMMARY OF THE INVENTION

An object is to provide a fiber gripper which is a precision molded component with stringent tolerances to maintain part functionality that will allow offline automatable fiber assembly into this molded component and subsequent automation assembly into a molded fiber optical housing.

An object is to provide a fiber gripper with trenches or grooves to allow the fibers to lay into the molded components. A number of configurations in regards to trenches or grooves can be used, including, but not limited to, v-grooves, u-grooves, square channels, rounds, etc.

An object is to provide a fiber gripper in which the fibers can be anchored at a back end of a fiber gripper housing to allow for buckling phenomena in physical contact connectors. Such anchoring can be done by, but not limited to, an adhesive, roughened surface or chemical treatment to the surface.

An object is to provide a fiber gripper which is a highly precision molded component to hold tolerances in the submicron range which will allow optical component functionality.

An object is to provide a fiber gripper which is versatile to allow for sub-assembly into a multitude of optical connector housings.

An embodiment is directed to a fiber gripper component. The fiber gripper component includes a fiber receiving recess which extends from a first surface of the fiber gripper component toward a second surface of the fiber gripper component. The fiber receiving recess extends from a front face to a rear face. The fiber receiving recess has a fiber receiving surface which is positioned between the first surface and the second surface. A plurality of resilient fiber receiving grooves extend from the fiber receiving surface toward the second surface. The resilient fiber receiving grooves have a width which is less than an outer-diameter dimension of mating optical fibers to provide a press fit of the optical fibers into the resilient fiber receiving grooves. The fiber gripper component is molded with tolerances in the submicron range to maintain part functionality to allow automatable fiber assembly.

An embodiment is directed to a fiber gripper component molded with tolerances in the submicron range to maintain part functionality to allow automatable fiber assembly. The fiber gripper component includes a fiber receiving recess which extends from a first surface of the fiber gripper component toward a second surface of the fiber gripper component. The fiber receiving recess extending from a front face of the fiber gripper component to the rear face of the fiber gripper component. The fiber receiving recess has a fiber receiving surface which is positioned between the first surface and the second surface. A plurality of resilient fiber receiving grooves extend from the fiber receiving surface toward the second surface. The resilient fiber receiving grooves have a width which is less than an outer-diameter dimension of mating optical fibers to provide a press fit of the optical fibers into the resilient fiber receiving grooves. A first cavity is provided on fiber gripper component. The first cavity extends from the fiber receiving surface toward the second surface, the first cavity is positioned proximate the front face. The optical fibers extend across the first cavity. The first cavity dimensioned to allow portions of the optical fibers to move or buckle therein. The fiber gripper component is molded with tolerances in the submicron range to maintain part functionality to allow automatable fiber assembly.

An embodiment is directed to a ferrule connector having a housing with a mating face and an oppositely facing fiber receiving face. The housing having a component receiving cavity extending from the fiber receiving face toward the mating face. A fiber gripper component has a fiber receiving recess which extends from a first surface of the fiber gripper component toward a second surface of the fiber gripper component. The fiber receiving recess extends from a front face fiber gripper component to a rear face fiber gripper component. The fiber receiving recess has a fiber receiving surface which is positioned between the first surface and the second surface. A plurality of resilient fiber receiving grooves extend from the fiber receiving surface toward the second surface. A first cavity extends from the fiber receiving surface toward the second surface. The first cavity is positioned proximate the front face. Optical fibers extend across the first cavity, the first cavity is dimensioned to allow portions of the optical fibers to move or buckle therein.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
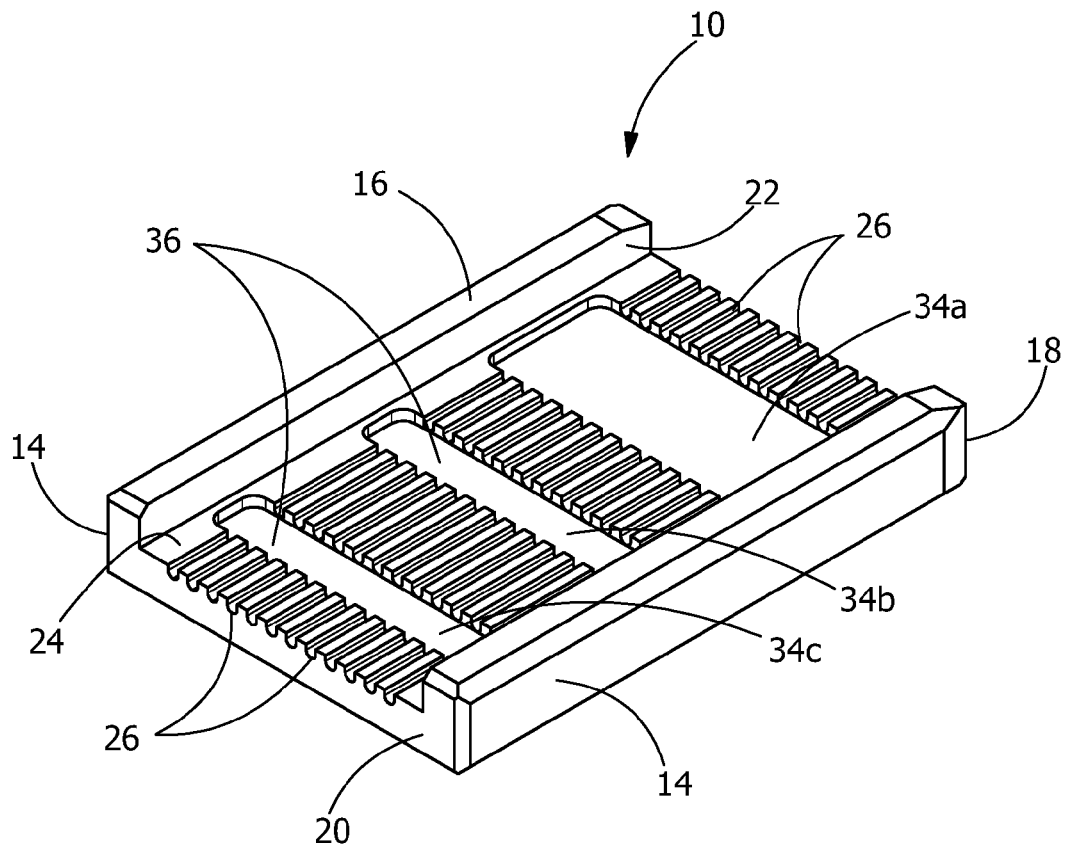
FIG. 1 is a top perspective view of an illustrative embodiment of a fiber gripper of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
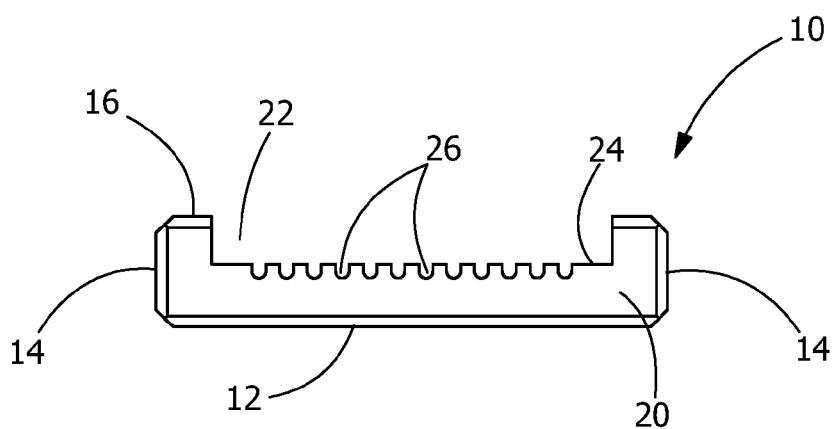
FIG. 2 is front view of the fiber gripper of FIG. 1.

Referring to FIGS. 1 and 2, a fiber gripper component 10 is shown. The fiber gripper component 10 may be molded from various materials, including, but not limited to, thermosetting resin such as epoxy resin or a thermoplastic resin such as liquid crystal polymer and polyphenylene sulfide (PPS).

The fiber gripper component 10 is a precision molded component with stringent tolerances to maintain part functionality that allows offline automatable fiber assembly into this molded component 10 and subsequent automation assembly into a housing, such as, but not limited to a molded fiber optical housing. The utilization of precision molding and machining technologies allows the tolerances of the component 10 and the grooves located thereon to be held in the submicron range which allows optical component functionality. Such submicron range may be, but is not limited to, between 1-999 nm, 1-500 nm, 500-999 nm. This automatable precision compatible fiber gripper component 10 allows for sub-assembly into a multitude of optical connector housings.

The fiber gripper component 10 includes a second or bottom surface 12, side surfaces 14 and a first or top surface 16. A front face 18 and an oppositely facing rear face 20 extend between the bottom surface 12 and the top surface 16. A fiber receiving recess 22 extends from the top surface 16 toward the bottom surface 12. The fiber receiving recess 22 extends from the front face 18 to the rear face 20. The fiber receiving recess 22 has a fiber receiving surface 24 which is positioned between the top surface 16 and the bottom surface 12. The fiber receiving surface 24 extending essentially parallel to the top surface 16 and the bottom surface 12.

Figure 3:
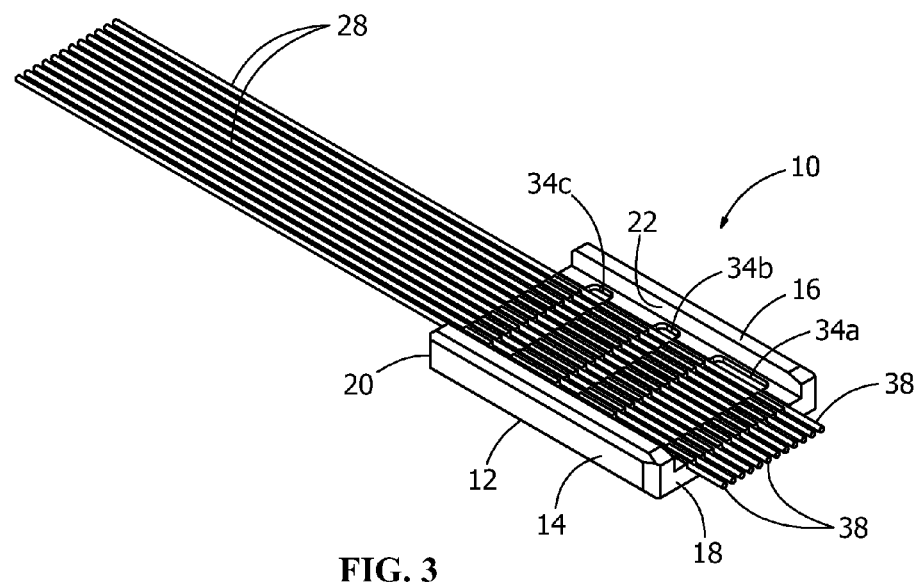
FIG. 3 is a top perspective of the fiber gripper of FIG. 1 with fibers positioned in the trenches.
Figure 4:
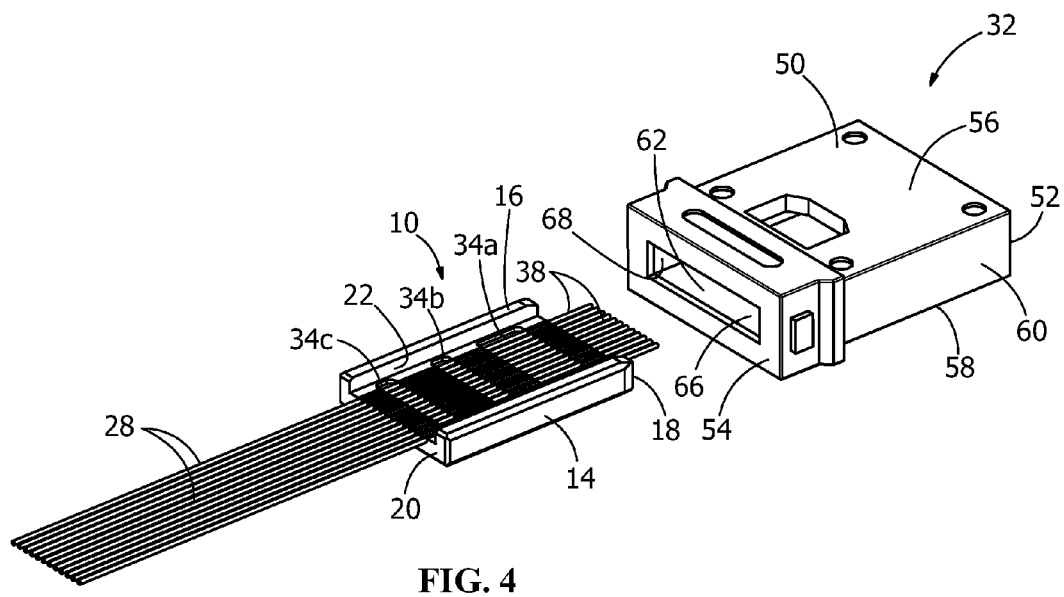
FIG. 4 is a perspective view of the fiber gripper of FIG. 1 prior to insertion into a connector housing.

A plurality of resilient fiber receiving slots or grooves 26 extend from the fiber receiving surface 24 toward the bottom surface 12. The number and spacing of the fiber receiving grooves 26 may vary depending upon the number of optical conduits or fibers 28 (FIG. 3) needed for the particular application.

As used herein, the term "groove" refers to, in general, any shaped opening extending from fiber receiving surface 24 partially or fully through bottom surface 12. In one embodiment of the present invention, the optical fiber 28 is an optical fiber. In another embodiment of the present invention, the optical fiber 28 is a waveguide. Resilient fiber receiving grooves 26 facilitate alignment of centers of optical fibers 28 received with centers of corresponding optical fibers of a complementary mating assembly.

Figure 6:
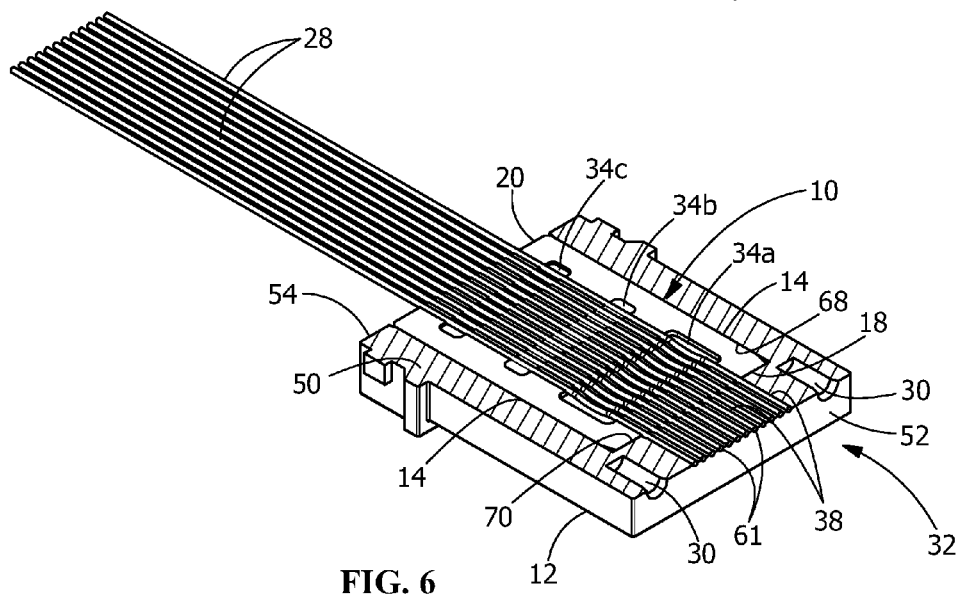
FIG. 6 is a cross-sectional view taken along line 6-6 of FIG. 5, showing the fiber gripper inserted into the housing.
Figure 10:
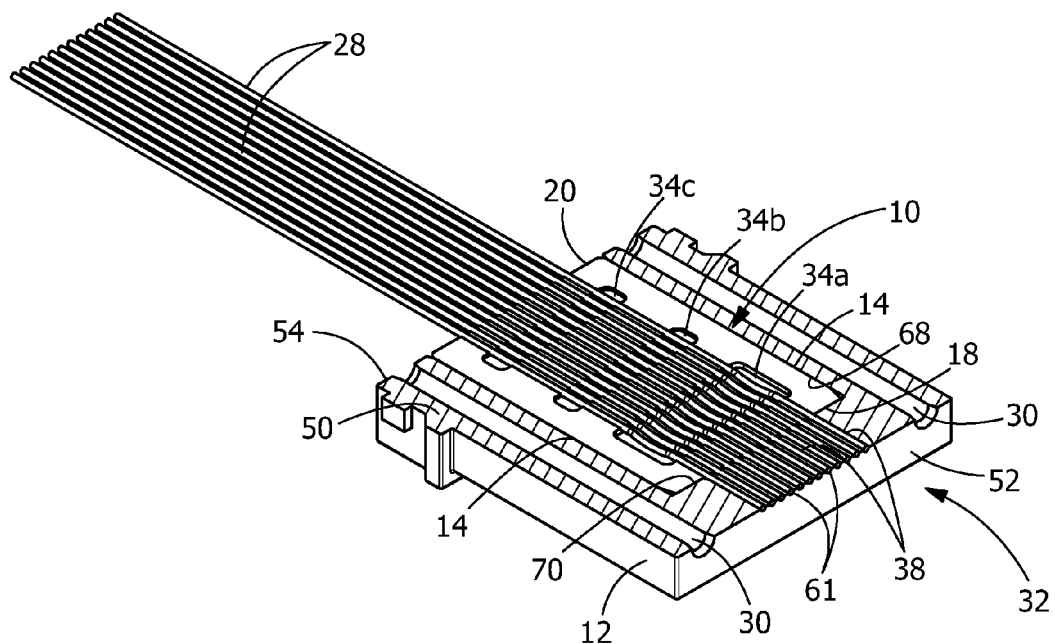
FIG. 10 is a cross-sectional showing the fiber gripper inserted into an alternate housing.

Resilient fiber receiving grooves 26 are located on the fiber receiving surface 24 to form a one-dimensional or a two-dimensional array of resilient fiber receiving grooves 26 on a fixed or variable pitch. Resilient fiber receiving grooves 26 are formed to have a width which is less than the outer-diameter dimension of the optical fibers 28 received. This is to insure a press fit of the optical fibers 28 into resilient fiber receiving grooves 26. Tolerance of the width of resilient fiber receiving grooves 26 and tolerance of the optical fiber 28 outer diameter are in differing amounts of compression fit when pressing the fibers 28 into the resilient fiber receiving grooves 26. The optical fibers 28 tend to be centered in the resilient fiber receiving grooves 26. A centerline through the centers of the optical fibers 28 received in resilient fiber receiving grooves 26 aligns with, or is offset from, the centerline of the guide pin alignment openings 30 of a ferrule connector 32 (FIG. 6 or FIG. 10).

Recesses or cavities 34 are provided on fiber gripper component 10. The cavities extend from the fiber receiving surface 24 toward the bottom surface 12. In the embodiment shown, a first cavity 34a is positioned proximate front face 18. A third cavity 34c is positioned proximate rear face 20. A second cavity 34b is positioned between the first cavity 34a and the third cavity 34c. In the areas of the cavities 34a, 34b, 34c, the resilient fiber receiving grooves 26 are not present. However, as the resilient fiber receiving grooves 26 are positioned on either side or end of the cavities 34a, 34b, 34c, the spacing of the optical fibers 28 extending across the cavities 34a, 34b, 34c is maintained in the same spacing as the optical fibers 28 when the optical fibers 28 are retained in the cavities 34a, 34b, 34c. The dimensions of the cavities 34a, 34b, 34c may vary.

Cavities 34b, 34c are positioned proximate the rear face 18. The cavities 34b, 34c are dimensioned to receive a holding mechanism 36, such as, but not limited to, adhesive or adhesive tape, to be retained therein. The use of the holding mechanism 36 retains the portions of the optical fibers 28 proximate the rear end 20 in position relative to the fiber gripper component 10. Cavity 34a is positioned proximate the front face 18. The cavity 34a is dimensioned to allow portions of the optical fibers 28 to move or buckle therein. This allows the optical fibers 28 to secured or anchored at the back end of the housing through the holding mechanism to allow for the ends of the optical fibers 28 proximate the front face 18 to buckle, as will be more fully described.

During assembly, optical fibers 28 are presented into open resilient fiber receiving grooves 26 from above in a downward motion. In some embodiments of the present invention, optical fibers 28 received in resilient fiber receiving grooves 26 are maintained in the resilient fiber receiving grooves 26 by press fit (as described above) and by bonding with the holding mechanism 36 after presentation into the resilient fiber retention grooves 26 (as described above). However, other methods of retaining the optical fibers 28 may be used, such as, but not limited to, roughened surfaces of grooves 26 or chemical treatment to the surface of the grooves 26. Regardless of the method of maintaining the optical fibers 28 in the grooves 26, the ends of the optical fibers 28 proximate the front or mating face 18 are movable relative to the fiber gripper component 10 as needed for mating (as will be more fully described). During assembly of embodiments using optical fibers as optical fibers 28, the end portions 38 of the optical fibers 28 protrude past front face 18 of fiber gripper component 10.

As previously stated, fiber gripper component 10 can be used to accommodate multiple optical fibers. In one embodiment of the present invention, fiber gripper component 10 is capable of accommodating 24 optical fibers with each fiber having an outer-diameter of about 125 μm. In another embodiment of the present invention, fiber gripper component 10 is capable of accommodating 24 optical fibers with each fiber having an outer-diameter such as, but not limited to, about 80 μm or 125 μm.

Although multi-fiber applications are shown and described herein, it should be appreciated that the invention is not limited to multi-fiber applications and is also applicable to ribbon fiber, planar waveguide arrays which are incorporated in Photonic Integrated Circuits (PICs) and waveguide ribbons as well.

As shown in FIGS. 4 through 7, with the fiber gripper component 10 properly assembled, the fiber gripper component 10 is moved into position relative to housing 50 of the ferrule connector 32. The ferrule housing 50 may be molded from various materials, including, but not limited to, thermosetting resin such as epoxy resin or a thermoplastic resin such as liquid crystal polymer and polyphenylene sulfide (PPS).

The ferrule housing 50 has a mating face or end face 52 and oppositely facing fiber receiving face 54. A top wall 56 and a bottom wall 58 extend between the mating face 52 and the fiber receiving face 54. Sidewalls 60 extend between the mating face 52 and the fiber receiving face 54 and extend from the top wall 56 to the bottom wall 58.

Two guide pin alignment holes or openings 30 extend through the mating face 52 and through at least a portion of the ferrule housing 50, as shown in FIG. 6 or extend through the ferrule housing 50, as shown in FIG. 10. The openings 30 are dimensioned to receive alignment pins (not shown) which extend through holes of a mating ferrule (not shown). In one illustrative embodiment, the ferrule housing 50 and the mating ferrule have the same construction. Fiber receiving holes or openings 61 extend through the mating face 52. The fiber receiving openings 61 are formed at a predetermined interval between the two guide pin alignment holes 30. In the embodiment shown, the centerline through the centers of the optical fibers 28 received in resilient fiber receiving grooves 26 aligns with the centerline of the guide pin alignment openings 30 of a ferrule connector 32 (FIG. 6). However, as previously stated, the centerline through the centers of the optical fibers 28 received in resilient fiber receiving grooves 26 may be offset from the centerline of the guide pin alignment openings 30 of a ferrule connector 32 without departing from the scope of the invention.

Figure 5:
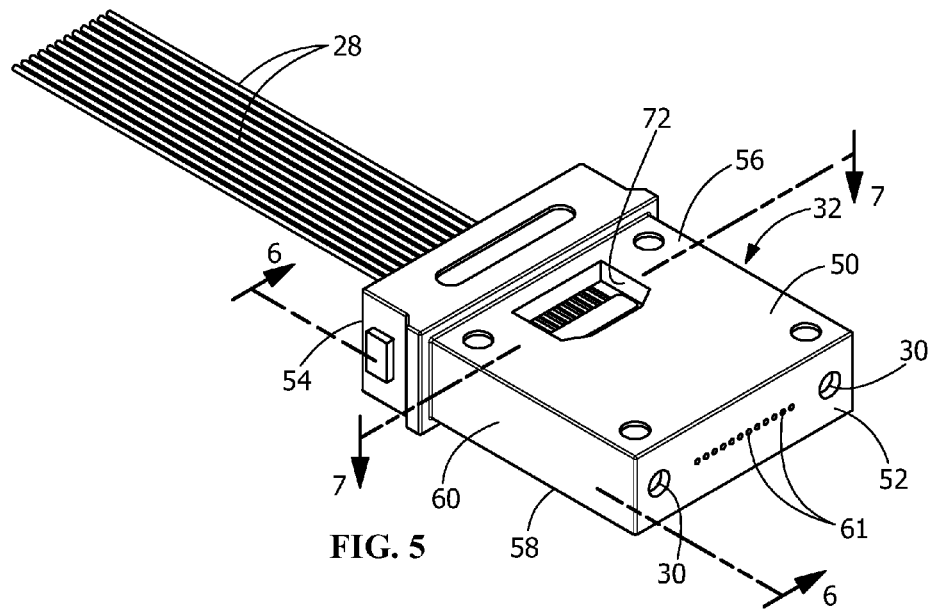
FIG. 5 is a perspective view of the connector housing with the fiber gripper inserted therein.
Figure 7:
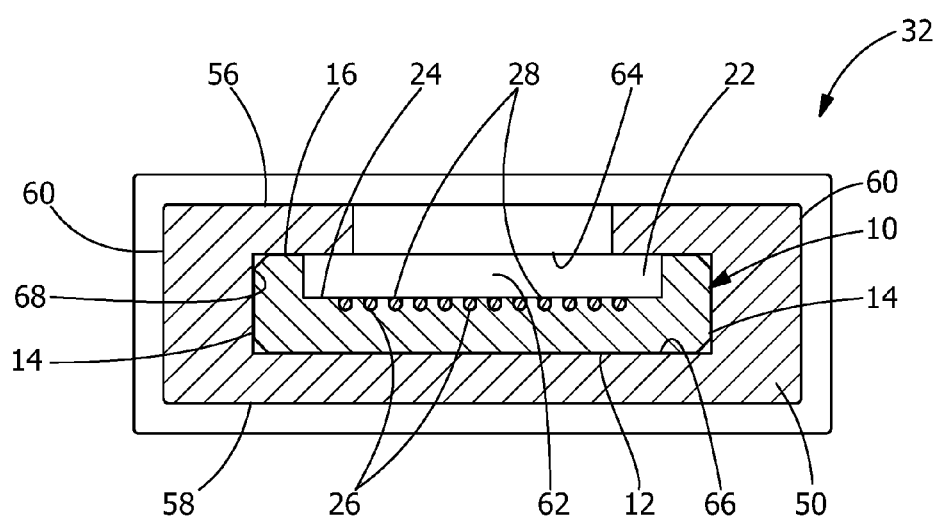
FIG. 7 is a cross-sectional view taken along line 7-7 of FIG. 5, showing the fiber gripper inserted into the housing.
Figure 8:
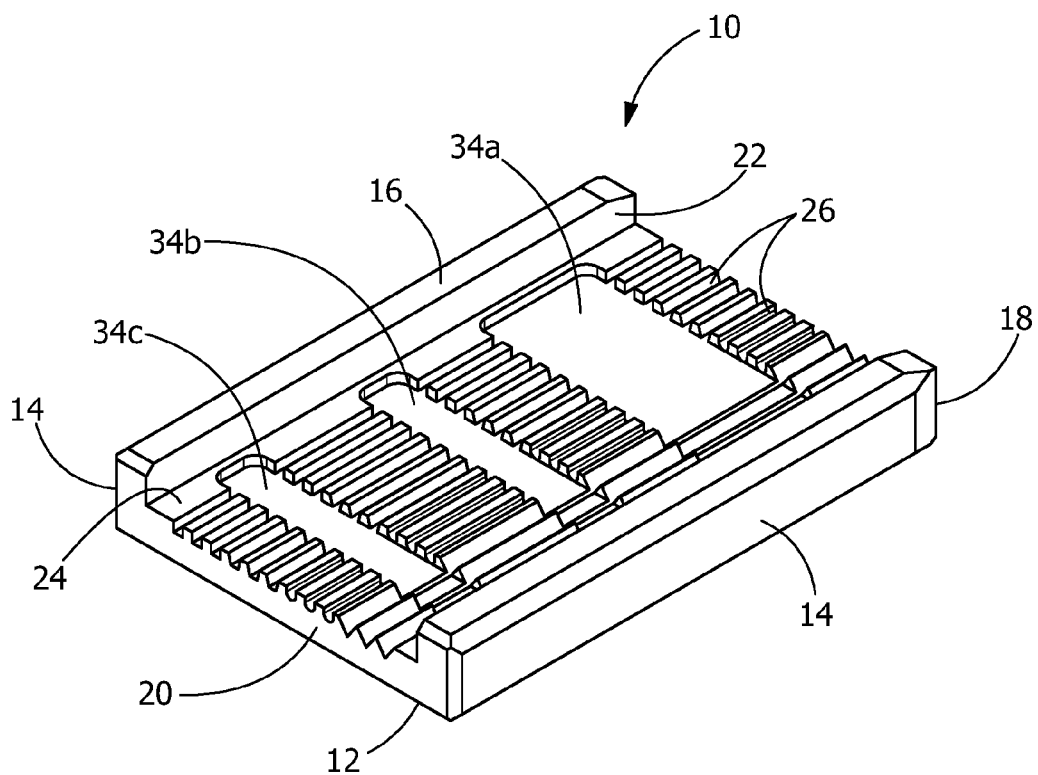
FIG. 8 is a top perspective view of an alternate illustrative embodiment of a fiber gripper of the present invention showing multiple configurations of the trenches.

As best shown in FIGS. 5 through 7, the housing 50 has a component receiving recess or cavity 62 which extends from the fiber receiving face 54 toward the mating face 52. The recess or cavity 62 has a top wall 64, a bottom wall 66, sidewalls 68 and an end wall 70 (FIG. 6). The fiber receiving openings 61 extend through the end wall 70. An opening 72 (FIG. 5) is provided in the top wall 56 of the housing 52. The opening 72 extends through the top wall 56 and through the top wall 64 and into the cavity 62.

The cavity 62 is dimensioned to retain the fiber receiving component 10 therein. In the embodiment shown, the component 10 is maintained and secured in cavity 62 by the frictional engagement between walls of the cavity 62 and surfaces of the component 10.

The cooperation of the walls of the cavity 62 and the surfaces of the component 10 accurately positions the component 10 in the cavity 62 such that the fiber receiving grooves 26 properly and accurately align with the fiber receiving openings 64. This allows the end portions 38 of the optical fibers 28 to be inserted into the openings 64 as the component 10 is inserted into the housing 50. However, other methods of securing and aligning the component 10 in the housing 50 may be used.

In the fully inserted position, the end portions 38 may extend through the openings 64, such that the end portions 38 extend beyond the mating face 52 of the housing 50. The end portions 38 may extend by, for example, but not limited to, 1-999 μm, 1-25 μm, 25-999 μm beyond the mating face 52.

The end portions 38 of the optical fibers 28 may be deflected or buckled, resulting in the end portions 38 of the optical fibers 28 having a bend proximate the ends thereof. As this occurs, the end portions 38 of the optical fibers 28 are forced to be moved back into the housing 50 of the connector 32, causing the end portions 38 to deflect or buckle in the cavity 34*a*, resulting in the optical fibers 28 having a bend in the end portions 38 thereof.

In so doing, the end portions 38 of the optical fibers 28 are moved into a planar configuration with the mating face 52, allowing for the attenuation characteristics of the fibers and the connector to be enhanced. The deflected or buckled portions 82 may be deflected the same distance or different distances, which may be useful if the fibers are cut to different lengths.

Alternatively, as two ferrules connectors 32 are joined or mated together, the mating faces 52 of each ferrule connector are moved together. While flush contact between their abutting mating faces 52 is desired, manufacturing tolerances and material flow (such a warping or bowing) make it difficult to provide the precision desired to place the mating ferrule connectors and their respective fibers in optimum position to minimize loss between the fibers of the respective ferrules.

Each mating face 52 has a relatively large surface. It is, therefore, difficult to precisely control the flatness of the mating face during the manufacturing or molding process. Often the mating faces may have largest flatness values of greater than five microns, greater than ten microns, etc. This results in an uneven surface in which a first portion of the mating face 52 of ferrule housing 50 is spaced from the mating face of the mating ferrule a greater distance than a second portion of the mating face 52 of ferrule housing 50 is spaced from the mating face of the mating ferrule. The uneven surface may cause various respective mating pairs of fibers to have a greater loss than other mating pairs of fibers in the same mating ferrules.

However, as the end portions 38 of the optical fibers 28 extend beyond the mating face 52, the end portions 38 may engage mating end portions even if the mating faces are uneven. As respective end portions 38 engage, the end portions 38 of the optical fibers 28 may be forced to be moved back into the housing 50 of the connector 32. As this occurs, the end portions 38 are caused to deflect or buckle in the cavity 34a, resulting in the optical fibers 28 having a bend in the end portions 38 thereof.

In so doing, the ends of the optical fibers 28 are moved into proper position and alignment with the mating optical fibers, allowing for the attenuation characteristics of the fibers and the connector to be enhanced. The deflected or buckled portions of the optical fibers 28 deflect the same distance or may deflect different distances, which may be useful if the fibers are cut to different lengths.

Figure 9:
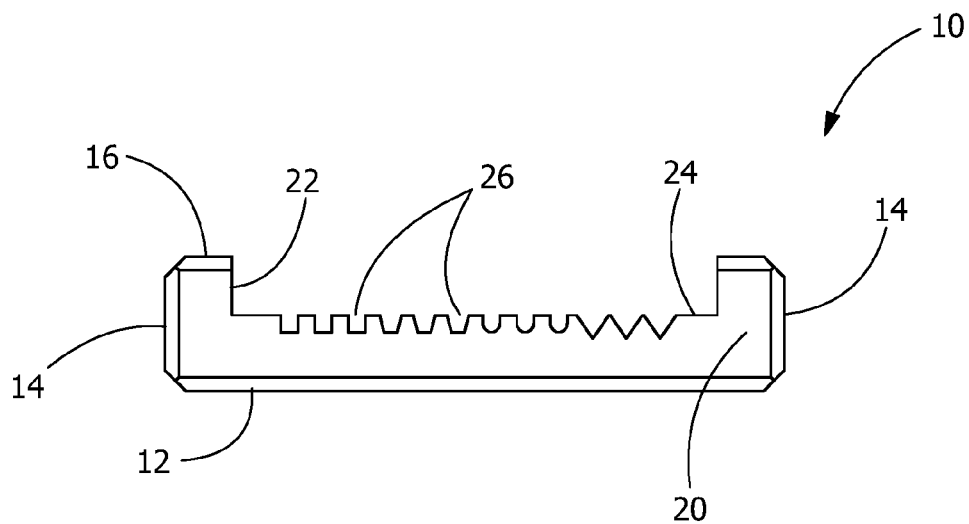
FIG. 9 is front view of the fiber gripper of FIG. 8.

As shown in FIGS. 9 and 10, alternate exemplary embodiments of the fiber gripper component 10 may have grooves 26 of one or more differing configurations. In the embodiment shown, various grooves of differing configurations are shown, however, in most applications, all of the grooves in a particular fiber gripper component 10 will be of the same configuration. The grooves 26 may be, but are not limited to, v-grooves, squared grooves or round grooves.

The fiber gripper component 10 is a precision molded component with stringent tolerances to maintain part functionality that will allow offline automatable fiber assembly into the fiber gripper component 10 and subsequent automation assembly into the molded fiber optical housing 50. The utilization of precision machining technologies allow a highly precision molded component to hold tolerances in the submicron range which will allow optical component functionality. This automatable precision compatible fiber gripper will be versatile to allow for sub-assembly into a multitude of optical connector housings.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A fiber gripper component comprising
a fiber receiving recess extending from a first surface of the fiber gripper component toward a second surface of the fiber gripper component, the fiber receiving recess extending from a front face to a rear face, the fiber receiving recess having a fiber receiving surface which is positioned between the first surface and the second surface; and
a plurality of resilient fiber receiving grooves extending from the fiber receiving surface toward the second surface, the resilient fiber receiving grooves having a width which is less than an outer-diameter dimension of mating optical fibers to provide a press fit of the optical fibers into the resilient fiber receiving grooves;
wherein the fiber gripper component is molded with tolerances in the submicron range to maintain part functionality to allow automatable fiber assembly, and wherein cavities are provided on fiber gripper component, the cavities extending from the fiber receiving surface toward the second surface.

2. The fiber gripper component as recited in claim 1, wherein a first cavity is positioned proximate the front face, a third cavity is positioned proximate the rear face, and a second cavity is positioned between the first cavity and the third cavity, the optical fibers extend across the cavities.

3. The fiber gripper component as recited in claim 2, wherein the second and third cavities are dimensioned to receive a holding mechanism therein, the holding mechanism retains the optical fibers proximate the rear end in position relative to the fiber gripper component.

4. The fiber gripper component as recited in claim 2, wherein the first cavity is dimensioned to allow portions of the optical fibers to move or buckle therein.

5. The fiber gripper component as recited in claim 1, wherein the tolerances of the resilient fiber receiving grooves are held in the submicron range which allows optical component functionality.

6. The fiber gripper component as recited in claim 1, wherein the fiber receiving surface extends essentially parallel to the first surface and the second surface.

7. The fiber gripper component as recited in claim 1, wherein the resilient fiber receiving grooves are located on the fiber receiving surface to form a one-dimensional or a two-dimensional array of resilient fiber receiving grooves on a fixed or variable pitch.

8. The fiber gripper component as recited in claim 1, wherein the optical fibers are centered in the resilient fiber receiving grooves.

9. The fiber gripper component as recited in claim 1, wherein the plurality of resilient fiber receiving grooves are V-grooves.

10. The fiber gripper component as recited in claim 1, wherein the plurality of resilient fiber receiving grooves are U-grooves.

11. The fiber gripper component as recited in claim 1, wherein the plurality of resilient fiber receiving grooves are square grooves.

12. The fiber gripper component as recited in claim 1, wherein the plurality of resilient fiber receiving grooves are round grooves.

13. The fiber gripper component as recited in claim 1, wherein the adhesive, epoxy or adhesive tape are provided in the fiber receiving grooves to help retain the fibers.

14. The fiber gripper component as recited in claim 1, wherein the fiber receiving grooves have roughened or chemically treated surface to help retain the fibers.

15. A fiber gripper component molded with tolerances in the submicron range to maintain part functionality to allow automatable fiber assembly, the fiber gripper component comprising:
a fiber receiving recess extending from a first surface of the fiber gripper component toward a second surface of the fiber gripper component, the fiber receiving recess extending from a front face of the fiber gripper component to the rear face of the fiber gripper component, the fiber receiving recess having a fiber receiving surface which is positioned between the first surface and the second surface;

a plurality of resilient fiber receiving grooves extending from the fiber receiving surface toward the second surface, the resilient fiber receiving grooves having a width which is less than an outer-diameter dimension of mating optical fibers to provide a press fit of the optical fibers into the resilient fiber receiving grooves; and a first cavity provided on fiber gripper component, the first cavity extending from the fiber receiving surface toward the second surface, the first cavity positioned proximate the front face, the optical fibers extending across the first cavity, the first cavity dimensioned to allow portions of the optical fibers to move or buckle therein;

wherein the fiber gripper component is molded with tolerances in the submicron range to maintain part functionality to allow automatable fiber assembly.

16. The fiber gripper component as recited in claim 15, wherein a third cavity is positioned proximate the rear face, and a second cavity is positioned between the first cavity and the third cavity, the optical fibers extend across the cavities, the second and third cavities are dimensioned to receive a holding mechanism therein, the holding mechanism retains the optical fibers proximate the rear end in position relative to the fiber gripper component.

17. A ferrule connector comprising;

a housing having a mating face and an oppositely facing fiber receiving face, the housing having a component receiving cavity extending from the fiber receiving face toward the mating face;

a fiber gripper component having a fiber receiving recess extending from a first surface of the fiber gripper component toward a second surface of the fiber gripper component, the fiber receiving recess extending from a front face of the fiber gripper component to a rear face of the fiber gripper component, the fiber receiving recess having a fiber receiving surface which is positioned between the first surface and the second surface, a plurality of resilient fiber receiving grooves extending from the fiber receiving surface toward the second surface, a first cavity extending from the fiber receiving surface toward the second surface, the first cavity positioned proximate the front face, optical fibers extending across the first cavity, the first cavity dimensioned to allow portions of the optical fibers to move or buckle therein.

18. The ferrule connector as recited in claim 17, wherein walls of the component receiving cavity cooperate with the surfaces of the fiber gripper component to accurately position the fiber gripper component in the component receiving cavity such that the fiber receiving grooves properly and accurately align with fiber receiving openings of the housing, allowing end portions of the optical fibers to be inserted into the fiber receiving openings.

19. The ferrule connector as recited in claim 17, wherein a second extends from the fiber receiving surface toward the second surface, the second cavity positioned proximate the rear face, optical fibers extending across the second cavity, the second cavity dimensioned to receive a holding mechanism therein, the holding mechanism retains the optical fibers proximate the rear end in position relative to the fiber gripper component.

* * * * *